United States Patent
Jones

[11] 3,715,936
[45] Feb. 13, 1973

[54] DIFFERENTIAL BEARING PRELOAD LOCK

[75] Inventor: Evan L. Jones, Detroit, Mich.

[73] Assignee: Chrysler Corporation, Highland Park, Mich.

[22] Filed: April 5, 1971

[21] Appl. No.: 131,386

[52] U.S. Cl. .................................. 74/713, 74/710.5
[51] Int. Cl. ............................. F16h 1/40, F16h 1/44
[58] Field of Search ............ 74/710, 713, 710.5, 711

[56] References Cited

UNITED STATES PATENTS

| 2,016,343 | 10/1935 | Oberem | 74/713 |
| 2,546,969 | 4/1951 | Buckendale | 74/713 |
| 2,609,710 | 9/1952 | Osborn | 74/713 |
| 1,471,915 | 10/1923 | Page | 74/713 |
| 1,614,992 | 1/1927 | Roberts | 74/713 |
| 1,880,655 | 10/1932 | Baits | 74/713 |
| 2,219,025 | 10/1940 | Vanderberg | 74/713 |

Primary Examiner—Arthur T. McKeon
Attorney—Talburtt and Baldwin

[57] ABSTRACT

Automotive differential mechanism including rotatable bearing adjusters for applying a predetermined load on bearings mounting a two-piece differential case. Locking members are provided for engaging the threads of the adjusters to inhibit rotation thereof.

10 Claims, 4 Drawing Figures

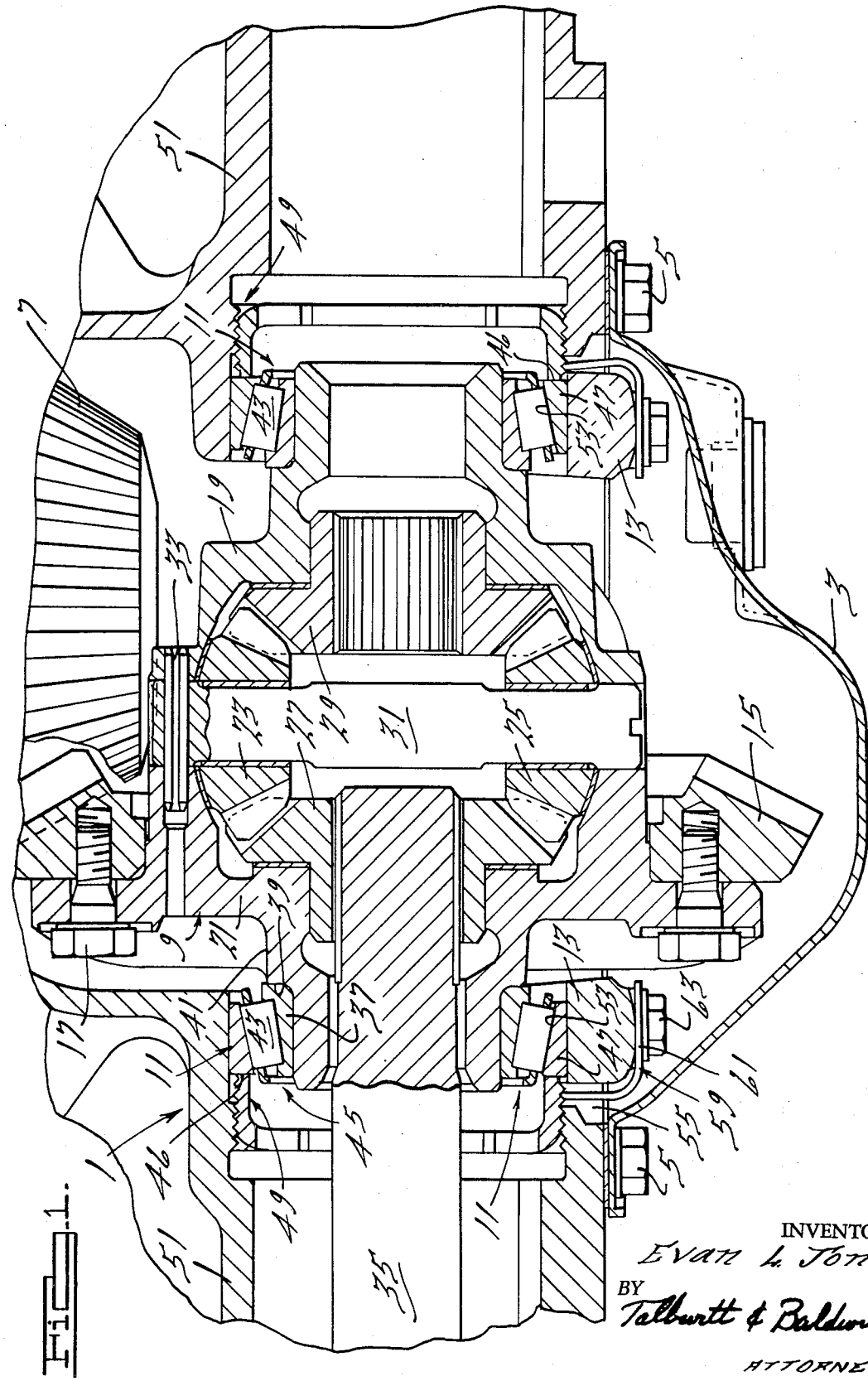

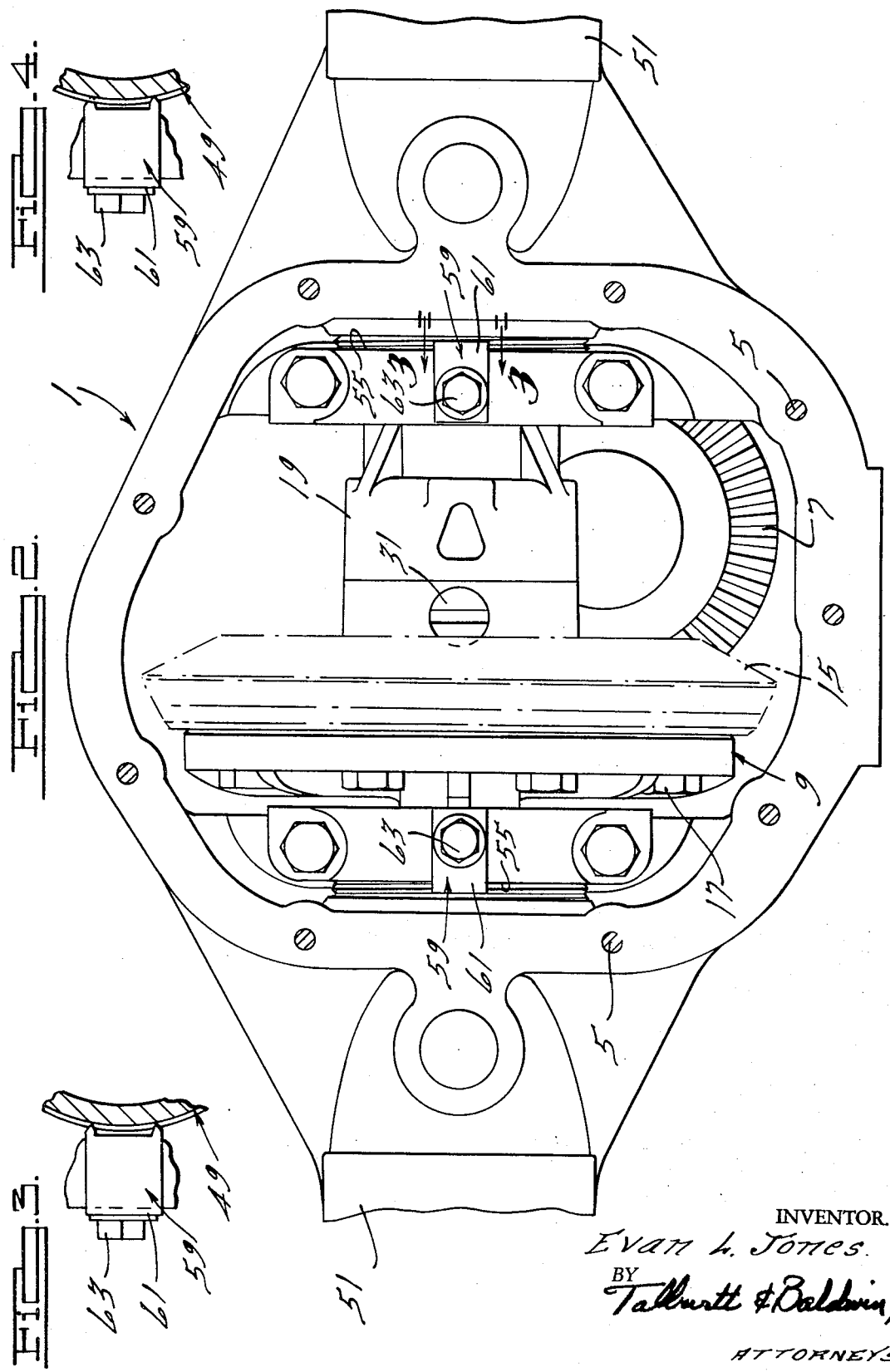

DIFFERENTIAL BEARING PRELOAD LOCK

BACKGROUND OF THE INVENTION

This invention relates to an axle assembly and more particularly to a lock for a bearing adjusting device in the differential of an automotive vehicle.

In automotive differentials it is desirable that a means be provided for adjusting gear position and bearing preload. This means may take the form of movable adjusters. These adjusters are locked in position when the appropriate load is applied to the bearings to keep adjusters from moving and thus maintain the desired preload. One type of adjuster has a plurality of holes spaced circumferentially around an end face thereof, a locking finger is connected to the bearing cap and extends into one of these holes to lock it in the desired position. Obviously, since the holes are spaced apart from one another, it is impossible to lock the adjuster in a position wherein the finger is in between two holes. The present invention obviates this inability to lock an adjuster in any desired position. Moreover, the present invention eliminates the difficulties which would be encountered if the accessibility to the perforated face were limited.

BRIEF SUMMARY OF THE INVENTION

Briefly, this invention comprises means for locking the adjuster mechanism for a differential bearing in a selected position.

One of the primary objects of this invention is to provide a differential bearing adjuster mechanism which may be locked in an infinite number of positions.

Another object of this invention is to provide a device such as described in which the driving gear portion may be adjusted relative to a driving pinion and locked in a desired adjusted position.

Still another object of this invention is to provide a device such as described which is adapted to lock an adjuster in a position in which a desired preload is applied to a bearing.

Another object of this invention is to provide a device of the class described which permits the desired backlash between the drive gear and pinion to be readily attained.

A further object of this invention is to provide a device such as described which is simple and economical in construction and efficient in operation.

Other objects and advantages of this invention will be made apparent as the description progresses.

BRIEF DESCRIPTION OF THE DRAWINGS

In the drawings, in which one of the various possible embodiments is illustrated, FIG. 1 is a longitudinal cross section taken through a differential mechanism along the axis of the rear axle;

FIG. 2 is a side view of the differential shown in FIG. 1, certain parts being removed for clarity;

FIG. 3 is a section taken along lines 3—3 of FIG. 2 and showing locking device of this invention in one position; and FIG. 4 is a view similar to FIG. 3 showing the locking device in another position.

Like parts are shown by corresponding reference characters throughout the several views of the drawings.

DESCRIPTION OF THE PREFERRED EMBODIMENT

Referring now to the drawings, the axle assembly comprises a drive pinion and differential case carrier unit 1 having, in the rear portion thereof, an opening adapted to be closed by a cover plate 3 secured to the case or housing by bolts 5.

A drive pinion shaft (not shown) is rotatably journalled in the carrier unit 1 and has an axle drive pinion 7 mounted on its rear end portion. A differential case is shown at 9 and is rotatably supported in carrier unit 1 by a pair of roller type differential bearings 11. The bearing assemblies 11 are connected to the carrier unit 1 by bearing caps 13. Case 9 carries a ring gear 15 which is fixedly secured thereto by bolts 17. Ring gear 15 is positioned so as to meshingly engage drive pinion 7.

As shown, differential case 9 is formed in two cup-shaped parts 19 and 21 which are machined to receive two differential pinions 23 and 25 and two side gears 27 and 29 meshing with the pinions. It will be understood that the parts 19 and 21 may be connected in any suitable manner. Moreover, it will be understood that the case 9 may be formed in one piece with suitable openings provided for inserting the gears. The pinions are rotatably mounted on a differential pinion shaft 31 which extends through diametrically opposed openings in case 9. A pin 33 secures the shaft 31 to the case 9. Side gear 27 is splined to one axle shaft 35 and side gear 29 is adapted to be splined to the other axle shaft (not shown).

Each differential bearing 11 includes an inner race or cone 37 at one end of which is adapted to abut a shoulder 39 in the adjacent neck portion 41 of case part 19 or 21. Rollers 43 or bearing cone assemblies 45 roll between cones 37 and outer races or cups 47. Bearing against the outer face 46 of cup 47, which face is generally perpendicular to the axis of the axle shafts 35, is the axially inner face of a tubular or ring shaped adjuster 49. Each adjuster 49 is threadedly engaged with the inside of tubular extension 51 of housing or case 1. The internal annular surface 53 of each bearing cup 47 is tapered as shown. It will be seen that pressure applied to face 46 will be transmitted through the rollers 43 and cone 37 to the shoulder 39 of case 9. The locations of shoulders 39 will determine the contact pattern between the teeth of gear 15 and pinion 7, and also the amount of backlash between the gear 15 and pinion 7. Accordingly, by varying the positions of shoulders 39 the contact pattern between the teeth can be controlled. Moreover, the differential bearings may be preloaded to give a more rigid mounting to the gear 15.

The pressure applied to the cups 47 may be varied by rotating the adjusters axially in or out, i.e., toward or away from the cups. The axially outward internal end of each adjuster 49 may be formed to receive a tool, such as a hexagonally head tool, for turning the adjuster.

An opening or window 55 is provided between an axially inner end of tubular extensions 51 and the caps 13. The caps are secured to the extension 51 by bolts 57. The locking device of this invention includes a generally L-shaped finger 59 having a first flat portion or leg 61 extending generally axially of the axis of shaft 35 and adapted to be secured to the cap 13 by a bolt 63. Another flat portion or leg 65 extends toward the threads of adjuster 49. The radially inner end of leg 65 is provided with two prongs or pointed extensions 67 and 69 at opposite corners of the leg. The extensions 67 and 69, as shown, have a length greater than the depth of the threads.

A proper contact pattern between the teeth of gear 15 and pinion 7 is attained in the following manner:

Using appropriate tools both bearing adjusters are turned until the backlash between the gear 15 and pinion 7 is within a predetermined range, such as 0.0005 to 0.0015, for example. The adjuster lock member 59 is then installed on the back side of gear 15 (the left-hand lock 59 as viewed in FIG. 1). The screw 63 associated with such lock is then tightened to force the prongs 67 and 69 tightly into engagement with the threads of the adjuster. Depending upon the position of the adjuster relative to the lock 59, the prongs 67 and 69 may both be located on the same side of a thread as in FIG. 3 or they may straddle a thread as shown in FIG. 4. In either event, the prongs are forced into engagement with the adjuster threads and inhibit any further rotation of the adjuster, thus maintaining the desired preload on the bearings.

Next, the bearing adjuster on the tooth side of gear 15 (the upper right-hand adjuster as viewed in FIG. 1) is turned to move it inward until backlash between gear 15 and pinion 7 is within a predetermined range, such as 0.006 to 0.008 inches, for example. This preloads the differential bearings and establishes desired backlash range. The cap bolts 57 are first tightened a predetermined amount and the adjuster lock 59 is installed and tightened down by the associated bolt 63. The gear tooth pattern is next checked to determine whether the drive gear backlash has been set properly. Additional slight adjustments may be necessary to obtain the exact pattern desired.

It will be seen that the locking devices of this invention permit an infinite range of bearing preload adjuster settings to be made. Obviously, this facilitates the arcuate setting of the contact pattern between the teeth of the drive gear and pinion.

In view of the foregoing, it will be seen that the several objects of the invention are achieved.

Although only one embodiment of the invention has been disclosed and described, it is apparent that other embodiments and modifications of the invention are possible.

I claim:

1. A differential mechanism comprising a differential carrier, a driving pinion rotatably mounted in said carrier, said carrier having tubular extensions through which axle shafts are adapted to extend, a differential case, bearing means mounting said case in said carrier for rotation about the axis of said axles, a gear connected to said case and meshing with said driving pinion, adjuster means in said carrier movable toward and away from said bearing means through a range in an infinite number of incremental movements for varying the load applied to such bearing means, and locking means for locking said adjuster means in an infinite number of positions throughout the range of adjuster means movement.

2. A differential mechanism as set forth in claim 1 wherein said adjuster means includes at least one threaded member threadably connected to at least one tubular extension on the inside of the latter, said locking means including a locking member having one leg extending toward the threads of said threaded member, said leg having means thereon for engaging said threaded member for inhibiting rotational movement thereof.

3. A differential mechanism as set forth in claim 2 wherein said locking member has a second leg extending generally parallel to the axis of said axles, and means for securing said second leg against movement relative to said carrier.

4. A differential mechanism as set forth in claim 2 wherein said means on said one leg for engaging said threaded member comprises at least one pointed extension, said pointed extension being adapted to engage the threaded portion of said threaded member.

5. A differential mechanism as set forth in claim 2 wherein said one leg is generally rectangular, said means on said leg for engaging said threaded member comprising two pointed extensions on said leg at the end thereof closer to said threaded member, said pointed extensions being spaced apart from one another.

6. A differential mechanism as set forth in claim 5 wherein said pointed extensions are located at opposite corners of one side of said rectangular leg.

7. A differential mechanism comprising a differential carrier, a driving pinion rotatably mounted in said carrier, said carrier having tubular extensions through which axle members are adapted to extend, a differential case comprising a first cup-shaped portion carrying a driven gear positioned for driving engagement with said pinion, a second cup-shaped portion adjacent said first cup-shaped portion, a differential pinion shaft extending between said two cup-shaped portions, means securing said differential pinion shaft to said cup-shaped portions, differential pinion gears mounted on said differential pinion shaft, first and second side gears respectively mounted in said first and second cup-shaped portions, the gears within said differential case being engaged with one another for the transmission of torque, each cup-shaped portion having an extension, bearing means between each extension on said cup-shaped portions and said carrier mounting said cup-shaped portions for rotation about the axis of rotation of said axle members, adjuster means in threaded engagement with said carrier and movable toward and away from said bearing means throughout a range in an infinite number of increment movements for varying the load applied thereto, and locking means for locking said adjuster means in any selected position within said range of movement thereof.

8. A differential mechanism as set forth in claim 7 wherein said threaded locking means includes two threaded members, one being adjacent each bearing means, said locking means including a locking member for each threaded member, each locking member having a first leg extending toward the threads of the adjacent threaded member, said leg having means thereon for engaging said threaded member for inhibiting rotational movement thereof.

9. A differential mechanism as set forth in claim 8 wherein said one leg is generally rectangular, said means on said leg for engaging said threaded member comprising two pointed extensions on said leg at the end thereof closer to said threaded member, said pointed extensions being spaced apart from one another.

10. A differential mechanism as set forth in claim 9 wherein said pointed extensions are located at opposite corners of one side of said rectangular leg.

* * * * *